(12) United States Patent
Sharma et al.

(10) Patent No.: US 8,340,952 B2
(45) Date of Patent: Dec. 25, 2012

(54) POWER ESTIMATION METHOD AND DEVICE THEREFOR

(75) Inventors: Puneet Sharma, Austin, TX (US); James C. Holt, Austin, TX (US); Kamal S. Khouri, Austin, TX (US); Hassan Al Sukhni, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 683 days.

(21) Appl. No.: 12/403,156

(22) Filed: Mar. 12, 2009

(65) Prior Publication Data

US 2010/0235159 A1    Sep. 16, 2010

(51) Int. Cl.
*G06F 17/50*    (2006.01)
(52) U.S. Cl. ............................................. 703/13; 703/14
(58) Field of Classification Search .................... 703/13, 703/14, 22
See application file for complete search history.

(56) References Cited

U.S. PATENT DOCUMENTS

| | | | |
|---|---|---|---|
| 5,557,557 A * | 9/1996 | Frantz et al. ..................... | 703/22 |
| 6,105,124 A * | 8/2000 | Farber et al. ................... | 712/208 |
| 6,125,334 A * | 9/2000 | Hurd .............................. | 702/60 |
| 7,051,300 B1 | 5/2006 | Shen et al. | |
| 7,249,331 B2 | 7/2007 | Bose et al. | |
| 7,290,346 B2 | 11/2007 | Szumer et al. | |
| 7,313,510 B2 * | 12/2007 | Karunaratne ................... | 703/14 |
| 7,725,848 B2 * | 5/2010 | Nebel et al. .................... | 716/136 |
| 7,770,140 B2 * | 8/2010 | Bell et al. ...................... | 716/106 |
| 7,802,236 B2 * | 9/2010 | Calder et al. .................. | 717/130 |
| 8,010,334 B2 * | 8/2011 | Bell et al. ....................... | 703/13 |
| 2006/0259981 A1 * | 11/2006 | Ben-Shoshan ................. | 726/27 |
| 2007/0136720 A1 | 6/2007 | Roy et al. | |

FOREIGN PATENT DOCUMENTS

| | | |
|---|---|---|
| EP | 1494110 A2 | 1/2005 |
| WO | 2006049690 A2 | 5/2006 |

OTHER PUBLICATIONS

Tiwari et al., "Power Analysis of Embedded Software: A First Step Towards Software Power Minimization", IEEE Transactions on Very Large Scale Integration (VLSI) Systems, vol. 2, No. 4, Dec. 1994, pp. 437-445.*

(Continued)

*Primary Examiner* — Kamini S Shah
*Assistant Examiner* — Herng-Der Day

(57) ABSTRACT

A set of instructions executable at an integrated circuit is partitioned into multiple instruction blocks. A first and second instruction block are executed multiple times, including a first execution and a second execution. The first execution of the first instruction block is associated with a first set of executions, and the first execution of the second instruction block is associated with a second set of executions. A first amount of energy consumption representative of a member of the first set of executions is determined, and a second amount of energy consumption representative of a member of the second set of executions is determined. The first amount of energy is assigned to each member of the first set, and the second amount of energy is assigned to each member of the second set, and used to determine a total amount of energy consumption associated with execution of the set of instructions.

18 Claims, 10 Drawing Sheets

OTHER PUBLICATIONS

Hsieh et al., "Profile-Driven Program Synthesis for Evaluation of System Power Dissipation" Power Analysis of Embedded Software: A First Step Towards Software Power Minimization, DAC '97 Proceedings of the 34th annual Design Automation Conference, 1997, pp. 576-581.*

Abrar, "Novel source-independent characterization methodology for embedded software energy estimation and optimization", Journal of Systems Architecture, vol. 51, 2005, pp. 395-404.*

Yu, Fang, "Power Analysis of Interrupt-Driven and Multi-Threaded Programs," Department of Computer Science, University of California, Los Angeles, Sep. 5, 2006, 9 pages.

Wolf, Fabian, "2002 Behavioral Intervals in Embedded Software: Timing and Power Analysis of Embedded Real-Time Software Processes," Kluwer Academic Publishers, Boston, 2002, pp. 122-128.

Ascia, Giuseppe, et al., "An Instruction-Level Power Analysis Model with Data Dependency," VLSI Design 2001, vol. 12, No. 2, pp. 245-273.

Brooks, David, et al., "Wattch: A Framework for Architectural-Level Power Analysis and Optimizations," IEEE Computer Architecture, 2000, Proceeding of the 27th International Symposium, pp. 83-94.

Tiwari, Vivek, et al., "Instruction Level Power Analysis and Optimization of Software," International Conference on VLSI Design, Banglore, India, Jan. 2006, 4 pages.

* cited by examiner

POWER ESTIMATION METHOD AND DEVICE THEREFOR

BACKGROUND

1. Field of the Disclosure

The present disclosure relates generally to data processing devices, and more particularly, to the analysis of power dissipation of data processing devices.

2. Description of the Related Art

Reduction in power consumption of data processing devices is desirable, especially for devices targeted for low-power applications, such as battery-powered applications. Elevated operating temperature due to power consumption at the data processing device can limit the operating frequency and therefore the computational performance of the device. Evaluation of power consumption of a data processing device design executing programs representative of real-world applications is advantageous. Unfortunately, such programs can be large, and power estimation techniques capable of operating on such programs have failed to provide acceptably accurate results, while techniques that achieve higher accuracy are typically too slow to permit simulating the execution of a large program.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As disclosed herein, power dissipation of a data processing device is estimated based on a simulated execution of a set of instructions at a device design that is a representation of the data processing device. The set of instructions is referred to as a workload program, and can be representative of a program that can be executed by the manufactured data processing device. The workload program is partitioned into a plurality of instruction blocks, wherein each instruction block includes a set of instructions. The workload program is also provided to an instruction set simulator operable to execute the workload program to provide an instruction execution trace. The instruction execution trace identifies the order in which the instruction blocks are executed. Each instruction block may be executed multiple times during the duration of the simulation, and each respective execution of an instruction block is referred to as an instruction block execution.

Each of the instruction block executions are classified based on predetermined criteria. Similarly classified instruction block executions of the same instruction block are grouped together at one of one or more clusters associated with that instruction block. One or more representative members of each cluster is characterized to provide energy dissipation information associated with that instruction block execution. The characterized energy dissipation is assigned to each member of that cluster. An estimation of the total amount of energy dissipated at the data processing device by execution of the workload program can be determined based on the energy dissipated by each instruction block execution. For example, a total amount of energy dissipated by the execution of the workload program can be determined by accumulating the energy dissipation information associated with each instruction block execution. Additionally, a profile of energy dissipated by the data processing device throughout the duration of the workload program execution can be determined. Energy information can be used to perform design optimizations of the device design to improve the performance or reduce the energy dissipation of the manufactured data processing device. As used herein, the term energy dissipation is synonymous with energy consumption. Furthermore, the terms energy and power may be interchanged herein in so much as power is the amount energy dissipated per unit of time.

Figure 1:
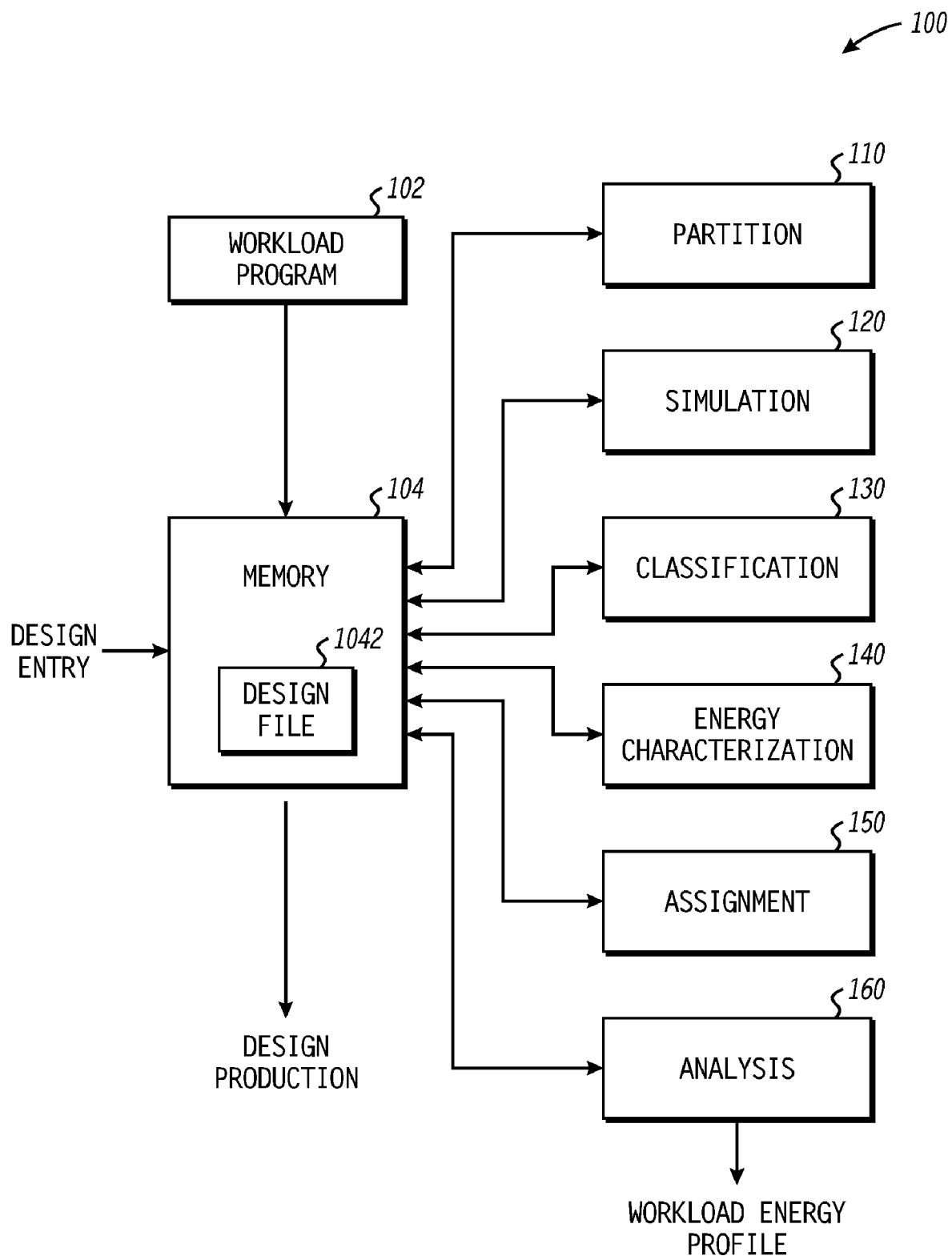
FIG. 1 is a block diagram illustrating a data processing device design system 100 including computer-aided design (CAD) applications modules in accordance with a specific embodiment of the present disclosure

FIG. 1 is a block diagram illustrating a design system 100 including application modules in accordance with a specific embodiment of the present disclosure. Design system 100 is operable to facilitate the design of a data processing device. Design system 100 includes a memory 104, a partition module 110, a simulation module 120, a classification module 130, an energy characterization module 140, an assignment module 150, and an analysis module 160. Memory 104 includes a design file 1042. Modules 120, 130, 140, 150, and 160, in one embodiment, are implemented as sets of instructions executed by one or more processors included at design system 100. Design system 100 is operable to estimate energy dissipated by a data processing device in response to a simulated execution of a workload program 102. The representation of the data processing device at design system 100 is referred to herein as a device design. The various application modules, e.g., modules 110, 120, 130, 140, 150, can be CAD (Computer Aided Design) software modules that are executed as described herein to estimate the energy dissipation for a device design.

Design file 1042 represents one or more databases used for storing a representation of a data processing device and associated attributes. Design file 1042 can receive design-entry information from design engineers and additional design properties and parameters from associated databases. Design file 1042 can include an application programming interface (API) to permit the CAD application modules to access and manipulate device design attributes. A device design at design file 1042 can represent a device using one or more viewpoints. For example, the device design can include a register transfer level (RTL) description of the device, a gate level representation of the device, and a transistor level representation of the device. Additional device design attributes can include any information that a design engineer and the CAD application modules need to develop and model the device being designed. When the design process is complete, the information stored at design file 1042 can be used for production of the data processing device. For example, design file 1042 can provide physical photo-mask information to an integrated circuit fabrication facility.

System 100 is configured to determine energy dissipation information associated with the execution of a workload program at a device design. Device design information is manipulated by the various modules of FIG. 1. Each application module performs a particular portion of a procedure to implement the methods disclosed herein. Each of application modules 110, 120, 130, 140, and 150 are connected to memory 104 to exchange information with design file 1042.

Workload program 102 can include a software application that is representative of a program that will be executed by the manufactured device. Workload program 102 is a set of instructions from an instruction set associated with the data processing device that are organized as one or more procedures and include one or more subroutines. For example, a workload program may include hundreds or thousands of instructions. Partition module 110 is configured to partition the workload program into a set of instruction blocks (BBs), wherein each BB includes a set of instructions that is a subset of the workload program. Therefore, each occurrence of an instruction of the workload program is a member of exactly one instruction block. BBs generally include fewer than fifty instructions, but can include a greater or lesser number of instructions. In an embodiment, workload program 102 is partitioned into BBs based on whether an instruction is a sequential instruction or non-sequential instructions, and wherein the last instruction included at each BB is a non-sequential instruction.

A sequential instruction is an instruction whose execution is always followed by the execution of the next adjacent instruction of workload program 102. A non-sequential instruction is an instruction whose execution may or may not be followed by the execution of the next adjacent instruction of workload program 102. Examples of non-sequential instructions include JUMP, JUMP CONDITIONAL, BRANCH, CALL, and the like. In another embodiment, a BB includes only one corresponding non-sequential instruction and this instruction is the final instruction included in that BB. The operation of partition module 110 is further described with reference to FIG. 2.

Figure 2:
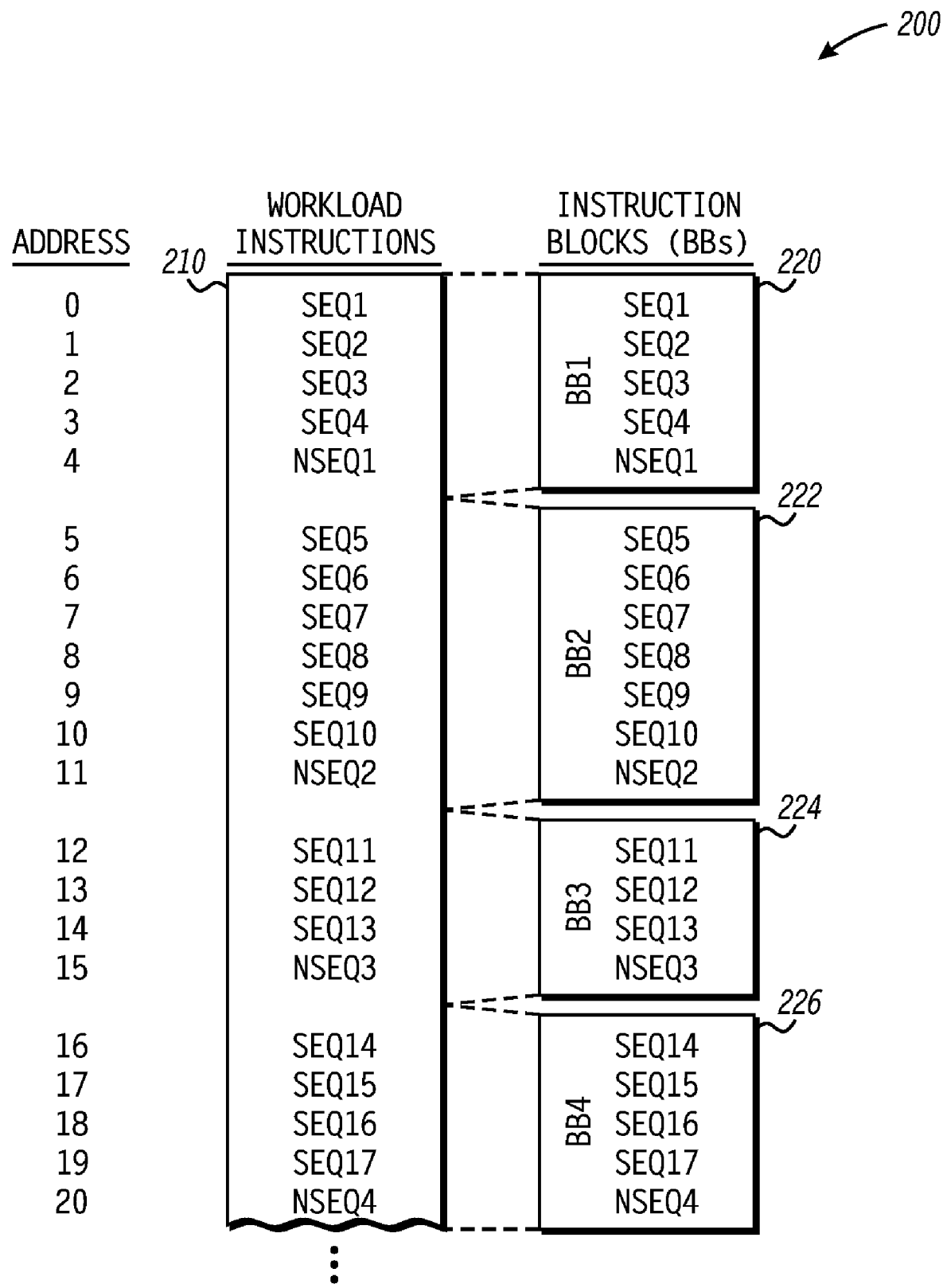
FIG. 2 is a block diagram illustrating the operation of a partition module of FIG. 1 in accordance with a specific embodiment of the present disclosure.

FIG. 2 is a block diagram 200 illustrating the operation of partition module 110 of FIG. 1 in accordance with a specific embodiment of the present disclosure. Block diagram 200 includes a plurality of instructions 210 representing a portion of workload program 102, and each instruction is associated with a respective address. For example, the first instruction included at portion 210 is identified as instruction SEQ1 and is located at address zero. Instruction SEQ1 is followed by instruction SEQ2 and is located at address one. Instructions at portion 210 are classified as either sequential instructions (SEQx) or non-sequential (NSEQx). The instructions at portion 210 are partitioned by partition module 110 into four BBs. Instructions SEQ1-4 and NSEQ1 are included at instruction block BB1 220, instructions SEQ5-10 and NSEQ2 are included at instruction block BB2 222, instructions SEQ11-13 and NSEQ3 are included at instruction block BB3 224, and instructions SEQ14-17 and NSEQ4 are included at instruction block BB4 226. Note that each BB provided by partition module 110 includes a non-sequential instruction as the last instruction of the instruction block.

Returning to FIG. 1, simulation module 120 is configured to simulate the execution of workload 102 on a device design represented at design file 1042. Simulation module 120 can include a cycle-accurate simulator or an instruction-set simulator, and can receive a high-level model of the device design such as a behavioral model or a RTL model. When workload program 102 is executed by simulation module 120, simulation module 120 provides an instruction execution trace. The execution trace is used to identify the order in which individual BBs were executed during the simulation of workload 102. Note that various BBs may be executed multiple times during the simulation of workload 102. Thus, a BB is a group of instructions, and a corresponding BBE is an execution of that instruction block. A BB that is not executed during the simulation of the workload is not associated with a corresponding BBE.

The instruction execution trace can also include a record of the state of relevant device design attributes at specific times during the simulated execution of each BB. For example, each BBE can include an indication of whether a cache-miss was encountered or whether a pipeline stall occurred during the execution of the BB. Other information that can be associated with a BBE is the value of particular configuration and mode-control variables, a value stored at a memory stack or a data cache, and the value of particular operands manipulated by instructions included at the BB. These attributes can be recorded due to their correlation to energy dissipation events. The operation of simulation module 120 is further described with reference to FIG. 3.

Figure 3:
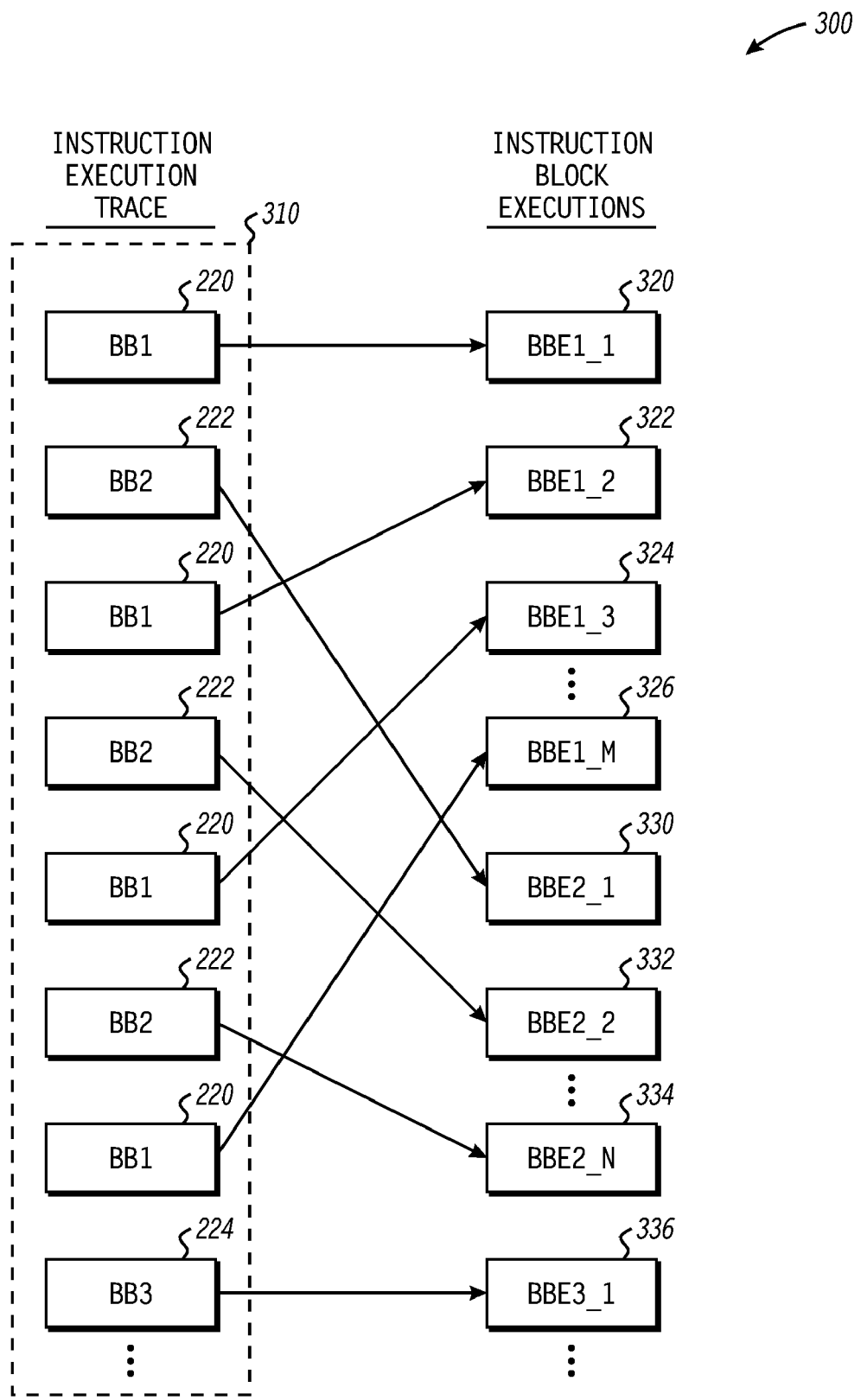
FIG. 3 is a block diagram illustrating the operation of a simulation module of FIG. 1 in accordance with a specific embodiment of the present disclosure.

FIG. 3 is a block diagram 300 illustrating the operation of simulation module 120 of FIG. 1 in accordance with a specific embodiment of the present disclosure. Block diagram 300 includes an instruction trace 310 that identifies the order that individual BBs were executed during the simulated execution of portion 210 of workload program 102. Each respective execution of a BB is represented in FIG. 3 by a corresponding instruction block execution (BBE). For example, instruction execution trace 310 illustrates that the execution of workload instructions 210 resulted in an execution of instruction blocks 220, 222, and 224 in a sequence BB1, BB2, BB1, BB2, BB1, BB2, BB1, and BB3. A small number of unique BBs and BBEs are included to simplify discussion, but it will be appreciated that workload program 102 may include additional BBs and each BB may be associated with additional BBEs.

Each execution of a BB is represented by a corresponding BBE. For example, the first execution of BB1 is identified as BBE1_1 320. Subsequent executions of BB1 are identified as BBE1_2 322, BBE1_3 324, and BBE1_M 326. The first execution of BB2 is identified as BBE2_1 330, and subsequent executions of BB2 are identified as BBE2_2 332, and BBE2_N 334. One execution of BB3 is identified as BBE3_1.

Returning to FIG. 1, classification module 130 is configured to classify each BBE based on predetermined criteria, and grouped into clusters (BBEC) based on their classification. All BBEs for a specific BB can be associated with a single cluster if each BBE of the BB is determined to be similar to the other BBEs of that BB. Alternatively, dissimilar BBEs for a specific BB can be separated into different clusters. The maximum number of clusters associated with a specific BB is the same as the number of individual BBEs associated with that BB. Criteria used to classify BBEs into clusters, and the number of clusters associated with the BBEs for a specific BB, determines the accuracy of the final power analysis provided by data processing design system 100, and the runtime of electronic device design system 100. For example, runtime can be reduced by classifying each execution of each BB into fewer clusters. On the other hand, the accuracy of the energy dissipation analysis may be improved by classifying BBEs into a relatively greater number of clusters based on device design attributes that are correlated with variations in power dissipation.

For example, the power dissipated by the execution of a floating point multiply instruction may depend significantly on the value of a rounding-mode specified by a MODE bit at a configuration register. Instruction execution trace 310 can record the state of the MODE bit during the execution of each BB, and BBEs associated with the same BB can be classified into different clusters based on the value of the MODE bit at the time of its execution. Similarly, an occurrence of a data cache miss during the execution of an instruction may result in greater power dissipation compared to a cache-hit, and classification of BBEs into clusters can take this information into account by classifying a BBE based upon the content of the cache. Furthermore, the instruction trace may include a set of attributes, and the classification procedure may optionally use all or a subset of the set of attributes based on desired accuracy and run-time considerations. The operation of classification module 130 is further described with reference to FIG. 4.

Figure 4:
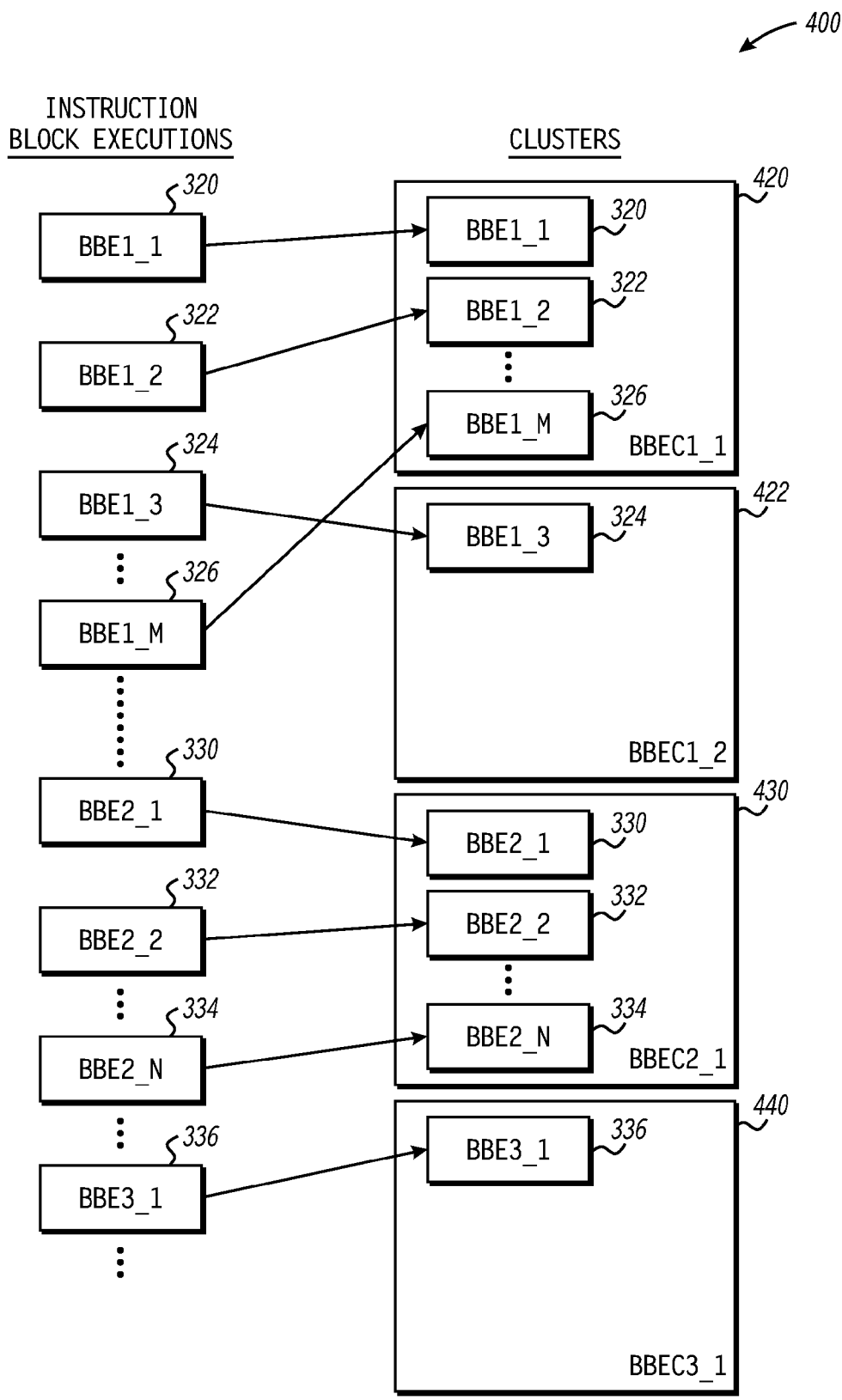
FIG. 4 is a block diagram illustrating the operation of a classification module of FIG. 1 in accordance with a specific embodiment of the present disclosure.

FIG. 4 is a block diagram 400 illustrating the operation of classification module 130 of FIG. 1 in accordance with a specific embodiment of the present disclosure. Block diagram 400 includes instruction block executions BBE 320-336, and clusters BBEC1_1 420, BBEC1_2 422, BBEC2_1 430, and BBEC3_1 440. Based on desired classification criteria, BBE 320, 322, and 326 are similarly classified and included together at cluster BBEC1_1 420. Based on a differentiating attribute, such as a value of a bit at a configuration register, BBE 324 is included in a second cluster BBEC1_2 422. Clusters BBEC1_1 420 and BBEC1_2 422 are both associated with executions of BB1 220. Classification module 130 has determined that all three executions associated with BB2 222 are similar and are thus included at a single cluster, BBEC2_1 430. BBE 336 is associated with cluster BBEC3_1 440. In an embodiment, all BBEs associated with a particular BB are grouped together at the same cluster, without regard to differentiating attributes. Each BBE included at instruction trace 310 is ultimately associated with a designated cluster. A cluster only includes BBEs associated with one BB.

Returning to FIG. 1, energy characterization module 140 is configured to estimate how much energy is dissipated by the device design during the execution of one representative BBE included at each cluster of BBEs. The estimated energy dissipation determined based on one BBE is considered representative of each BBE included at that cluster. Characterization module 140 includes a dynamic power simulator, wherein stimulus signals are provided to a gate-level or transistor-level representation of the device design. The stimulus signals emulate the actual operation of the device design when executing the particular BBE, and the power simulator estimates the energy dissipated by the device design in response to the representative BBE. The energy dissipation information provided by characterization module 140 can include dynamic energy dissipation and static (leakage) dissipation information. Furthermore, the device design can be specifically configured based on selected attributes provided by instruction execution trace 310. For example, configuration registers included at the device design can be initialized so that the subsequent energy characterization reflects the particular effect of the exemplary configuration. A representative BBE from each cluster is characterized in the same manner. In another embodiment, more than one member of each cluster can be characterized and the corresponding results of each characterization can be averaged, or based on some other mathematical operation. For example, BBE1_1 and BBE1_2 of cluster BBEC1_1 can both be characterized to provide two respective energy dissipation results, and an average of the two results is considered representative of every member of cluster BBEC1_1. The operation of characterization module 130 is further described with reference to FIG. 5.

Figure 5:
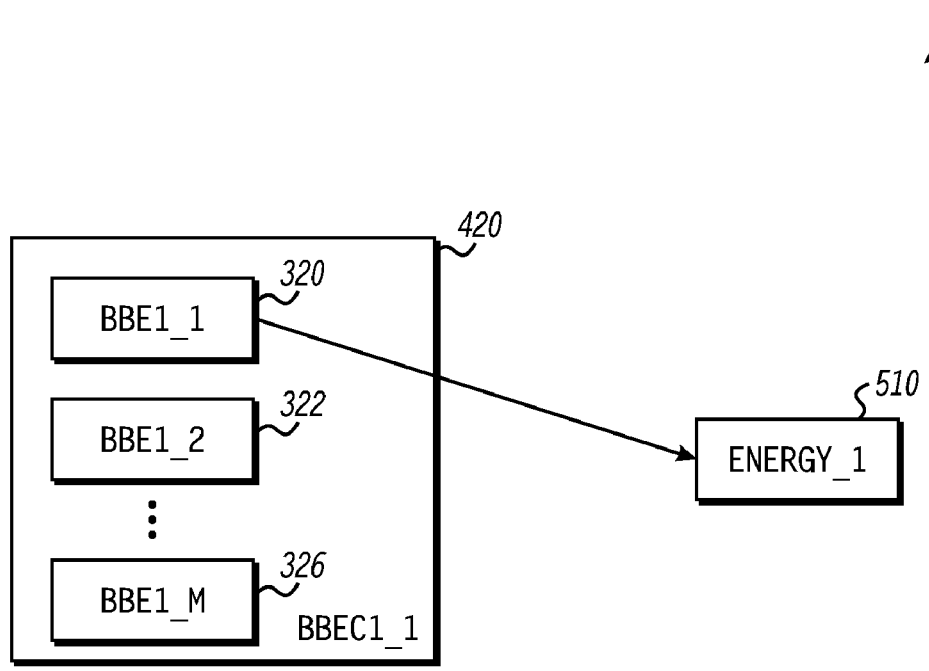
FIG. 5 is a block diagram illustrating the operation of an energy characterization module of FIG. 1 in accordance with a specific embodiment of the present disclosure.

FIG. 5 is a block diagram 500 illustrating the operation of energy characterization module 140 of FIG. 1 in accordance with a specific embodiment of the present disclosure. Block diagram 500 includes cluster BBEC1_1 420 including BBE 320, 322, and 326. Energy characterization module 140 characterizes BBE1_1 320 to provide ENERGY_1 510. ENERGY_1 510 is the result of an energy simulation of the device design and represents an estimate of energy dissipated by the device design in response to executing the instructions included at BBE1_1 320. Note that only one member of cluster 420 is characterized, i.e., not every member of cluster 420 is characterized.

Returning to FIG. 1, assignment module 150 is configured to assign the energy dissipated by the representative member of a cluster to each member of that cluster. Thus, a particular instruction block, such as BB1 220, may be executed many times during the simulation of workload 102, but only a single BBE or a portion of the corresponding BBEs are characterized by energy characterization module 140. Energy characterization represents the majority of the computational work required to estimate an energy dissipation profile corresponding to a workload program, so reducing the number of BBEs that are characterized reduces the run-time required to prepare the energy dissipation profile substantially proportionally. The operation of assignment module 150 is further described with reference to FIG. 6.

Figure 6:
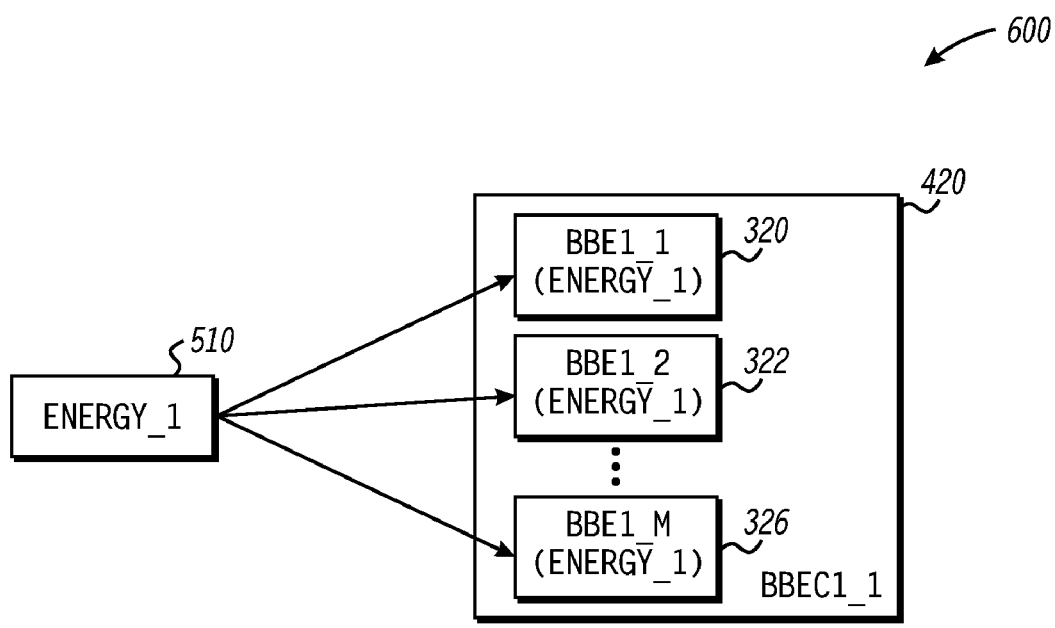
FIG. 6 is a block diagram illustrating the operation of an assignment module of FIG. 1 in accordance with a specific embodiment of the present disclosure.

FIG. 6 is a block diagram 600 illustrating the operation of assignment module 150 of FIG. 1 in accordance with a specific embodiment of the present disclosure. Block diagram 600 illustrates how assignment module 150 assigns the energy dissipation resulting from the characterization of one representative member of each respective cluster to all members of the corresponding cluster. For example, ENERGY_1 510 represents the energy dissipation resulting from the characterization of BBE1_1 320 of cluster BBEC1_1 420. Assignment module 150 assigns this amount of energy dissipation to each member of cluster BBEC1_1 420, specifically BBE1_1, BBE1_2, and BBE1_M. This procedure is repeated for each cluster, wherein the characterized energy dissipation of a representative member of each respective cluster is assigned to each member of the corresponding cluster.

Returning to FIG. 1, analysis module 160 is configured to determining a total amount of energy dissipation 700 associated with execution of workload program 102, wherein each BBE included at each cluster contributes towards a total amount of energy dissipated by the device design during execution of workload program 102. Energy dissipation can be analyzed and represented as a total amount of energy dissipation over the duration of the execution of workload program 102, as a peak energy dissipation corresponding to the execution of a particular BBE, as a time-averaged energy dissipation corresponding to a moving window of time, or the like.

For example, a total amount of energy dissipation over the duration of the execution of workload program 102 is calculated by adding together the individual energy dissipation values associated with each BBE included at each cluster. This is equivalent to adding together the individual energy dissipation values associated with the execution of each consecutive BBE included at instruction execution trace 310. A time-varying energy dissipation profile can be represented by associating each successive BBE included at instruction trace 310 with its respective energy dissipation value. Thus, energy dissipation is analyzed relative to the execution of each BB over the duration of the execution of workload program 102. For example, energy dissipation corresponding to instruction execution trace 310 (FIG. 3) and determined at time intervals corresponding to the execution of each successive BB, is ENERGY_1, ENERGY_2, ENERGY_1, ENERGY_2, etc., as will be better understood with reference to operation of analysis module 160 as further described with reference to FIG. 7.

Figure 7:
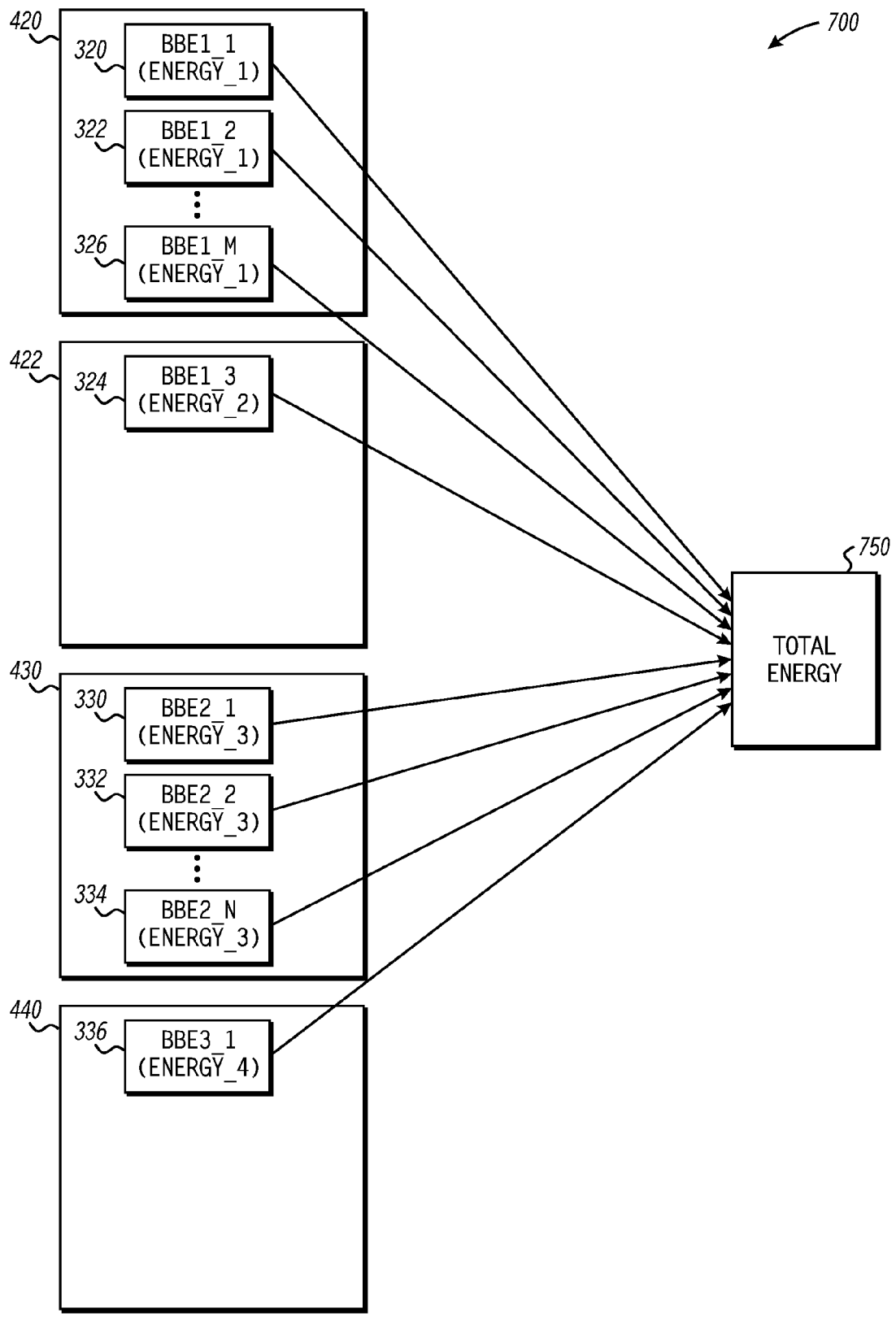
FIG. 7 is a block diagram illustrating the operation of an analysis module of FIG. 1 in accordance with a specific embodiment of the present disclosure.

FIG. 7 is a block diagram 700 illustrating the operation of analysis module 160 of FIG. 1 in accordance with a specific embodiment of the present disclosure. Block diagram 700 includes clusters 420, 422, 430, and 440, and TOTAL ENERGY 750. Cluster 420 includes BBE 320, 322, 326, and each BBE at cluster 420 is assigned an energy dissipation of ENERGY_1. Cluster 422 includes BBE 324, which is assigned an energy dissipation of ENERGY_2. Cluster 430 includes BBE 330, 332, and 334, and each BBE at cluster 430 is assigned an energy dissipation of ENERGY_3. Cluster 440 includes BBE 336, which is assigned an energy dissipation of ENERGY_4.

As previously discussed, each BBE included at instruction execution trace 310 is included in one cluster, and each BBE of a common cluster is associated with an assigned energy dissipation. Thus, the total amount of energy dissipation over the duration of the execution of workload program 102 is calculated by adding together the individual energy dissipation values associated with each BBE included at each cluster. The sum of all of the individual energy dissipation values is illustrated as TOTAL ENERGY 750. As previously described, a profile of energy dissipation over time can be represented based on the succession of BBEs identified at instruction execution trace 310. Time-averaged energy dissipation information and thermal characteristics of the manufactured device can be used to calculate the operating temperature of the device when executing workload program 102. Energy information can be used to perform design optimizations of the device design to improve the performance or reduce the energy dissipation of the manufactured data processing device.

Figure 8:
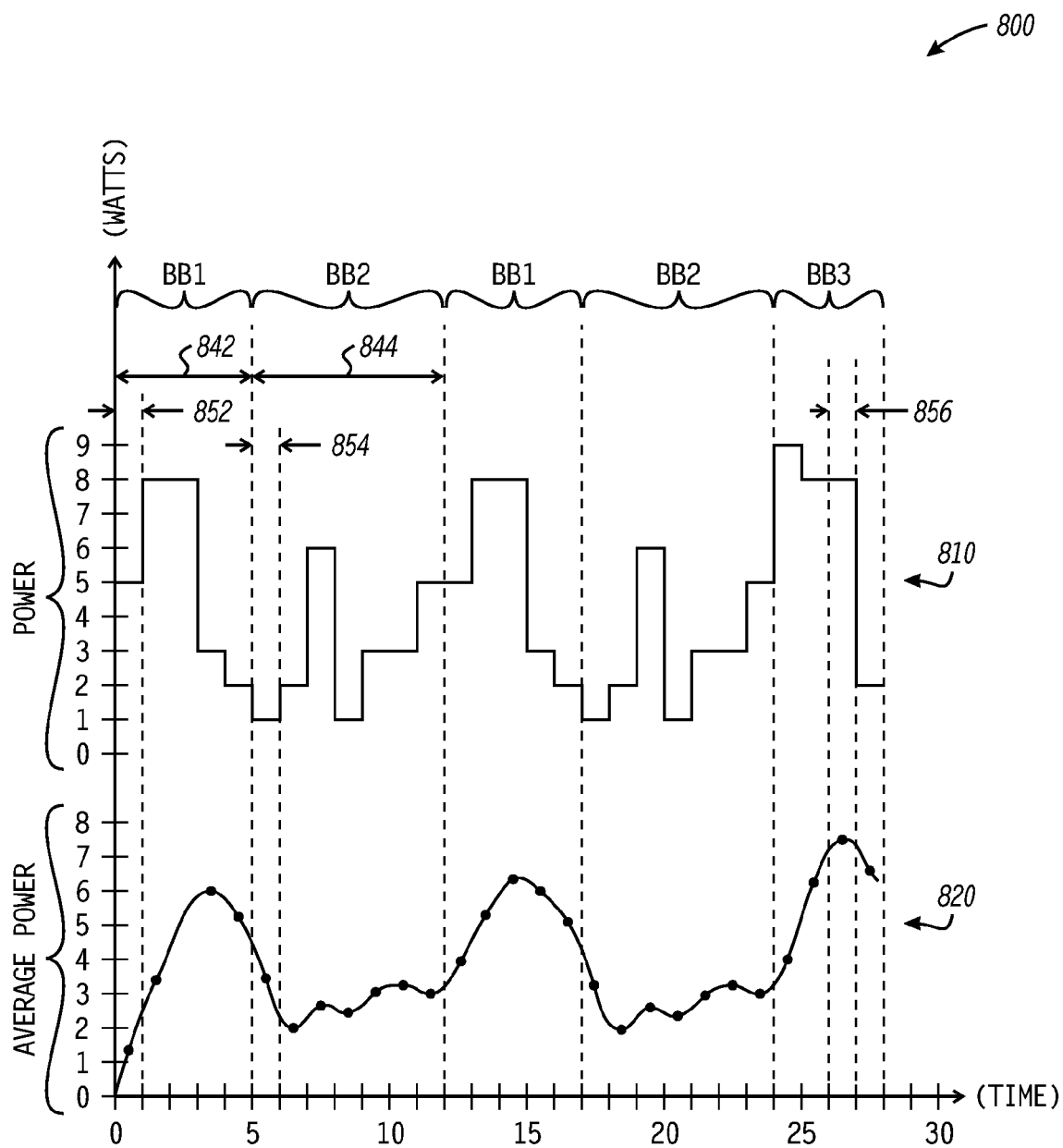
FIG. 8 is a timing diagram illustrating total energy dissipation associated with the simulated execution of a workload program in accordance with a specific embodiment of the present disclosure.

FIG. 8 is timing diagram 800 illustrating total energy dissipation associated with the simulated execution of a workload program in accordance with a specific embodiment of the present disclosure. Timing diagram 800 has a horizontal axis representing time and a vertical axis representing power in watts. Timing diagram 800 includes waveform 810 and waveform 820, and intervals 842, 844, 852, 854, and 856. Waveforms 810 and 820 illustrate two examples of a profile of total energy dissipation at a device design.

Timing diagram 800 illustrates the execution of instruction blocks BB1 220, BB2 222, and BB3 224 in the order: BB1, BB2, BB1, BB2, BB3. The first execution of BB1 220 occurs during interval 842, and the first execution of BB3 222 occurs during time interval 844. BB1 220 includes five instructions, BB2 222 includes seven instructions, and BB3 224 includes four instructions, as illustrated at FIG. 2. Intervals 852, 854, and 856 each correspond to the execution of a single instruction. For example, interval 852 represents an amount of time corresponding to the execution of instruction SEQ1, interval 854 represents an amount of time corresponding to the execution of instruction SEQ5, and interval 856 represent the amount of time corresponding to the execution of instruction SEQ13. It will be appreciated that the amount of time necessary for the execution of a particular instruction can vary based on the type of instruction and based on conditions present at the device design at the time that an instruction is executed. For simplicity, the execution of each instruction at timing diagram 800 has the same duration.

Waveform 810 represents power dissipation associated with execution of each individual instruction included in a sequence of instruction block executions. The total power dissipated by the execution of each instruction is illustrated. In another embodiment, energy characterization module 140 provides energy dissipation information at more than one time during the execution of each instruction. Waveform 810 generally illustrates approximately instantaneous energy dissipated by the device design at specific times during the execution of workload program 102. Energy dissipation information displayed in this way may be useful for identifying excessive resistive voltage drop at conductors included at the device design.

Waveform 820 represents time-averaged power dissipation based on an average of the power dissipation associated with the execution each instruction and three proceeding instructions. Energy dissipation information displayed in this way may be useful for identifying excessive average power consumption at the device design that can contribute to excessive operating temperatures. Average power in excess of a particular limit can alert the design engineer to a potential design problem. For example, if a design specification stipulates that the maximum average power dissipated by the device design should not exceed seven watts, a value greater than seven watts, such as identified at interval 856, is indicative of a design problem. Energy dissipation information can be analyzed based on an average of a lesser or greater number of instruction executions or instruction block executions, or based on a particular period of time depending on how the information is to be used.

Figure 9:
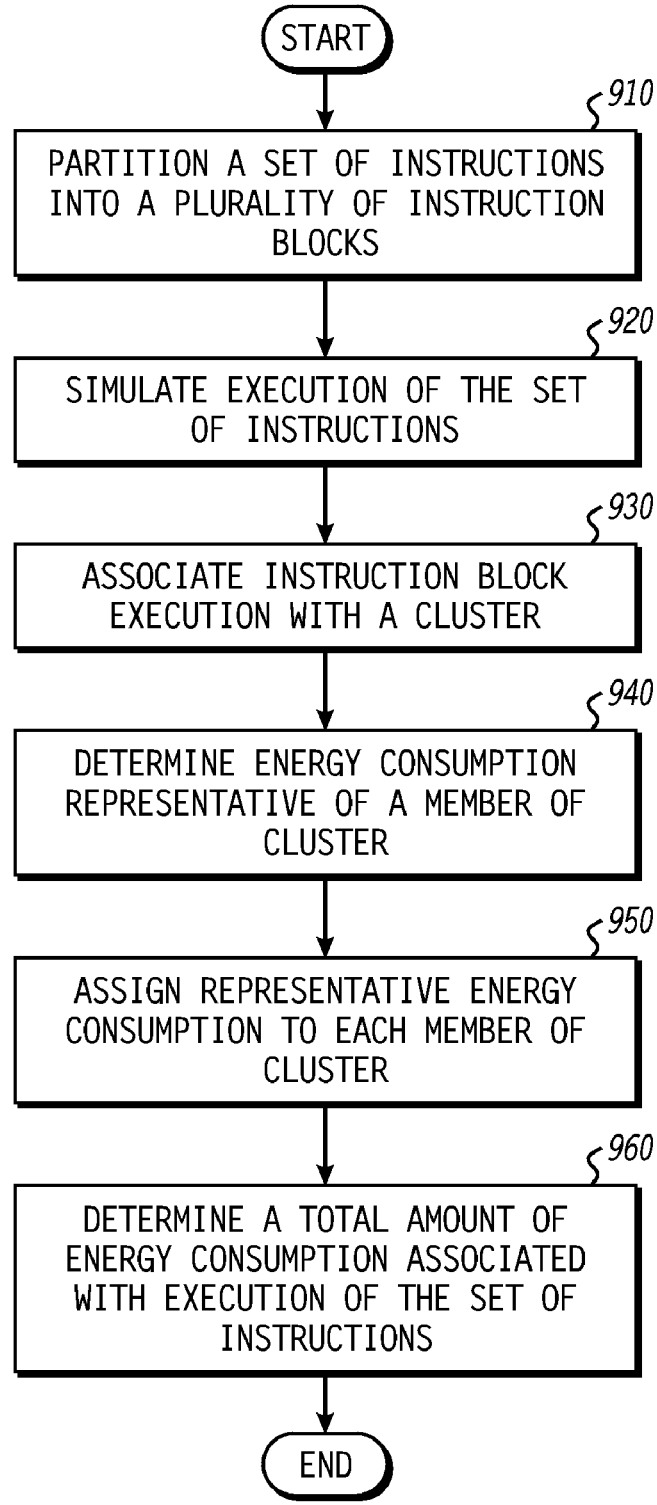
FIG. 9 is a flow diagram illustrating a method in accordance with a specific embodiment of the present disclosure.

FIG. 9 is a flow diagram illustrating a method 900 in accordance with a specific embodiment of the present disclosure. Method 900 begins at block 910 where partition module 110 partitions a set of instructions, such as workload program 102, into a plurality of instruction blocks. Each instruction block includes a sequence of instructions and the last instruction of the sequence is a non-sequential instruction. Each instruction of the set of instructions is a member of exactly one instruction block. The flow proceeds to block 920 where workload program 102 is provided to simulation module 120, which provides an instruction execution trace 310. Instruction execution trace 310 specifies a sequence of instruction block executions. The flow proceeds to block 930 where each instruction block execution is associated with a cluster by classification module 130. Each cluster includes a portion of the instruction block executions, or all of the instruction block executions, associated with a particular instruction block, based on desired classification criteria. Instruction block executions corresponding to a particular instruction block are generally grouped together at a common cluster when they share similar energy dissipation characteristics. Similar energy dissipation characteristics are correlated with particular values stored at a register, a value of a bit of a register, a value stored at a cache, a value included at a memory stack, or other information and attributes that are determined to be appropriate for this purpose. The association of a BBE with particular clusters based on the value of a bit at a register is illustrated with reference to FIG. 10.

Figure 10:
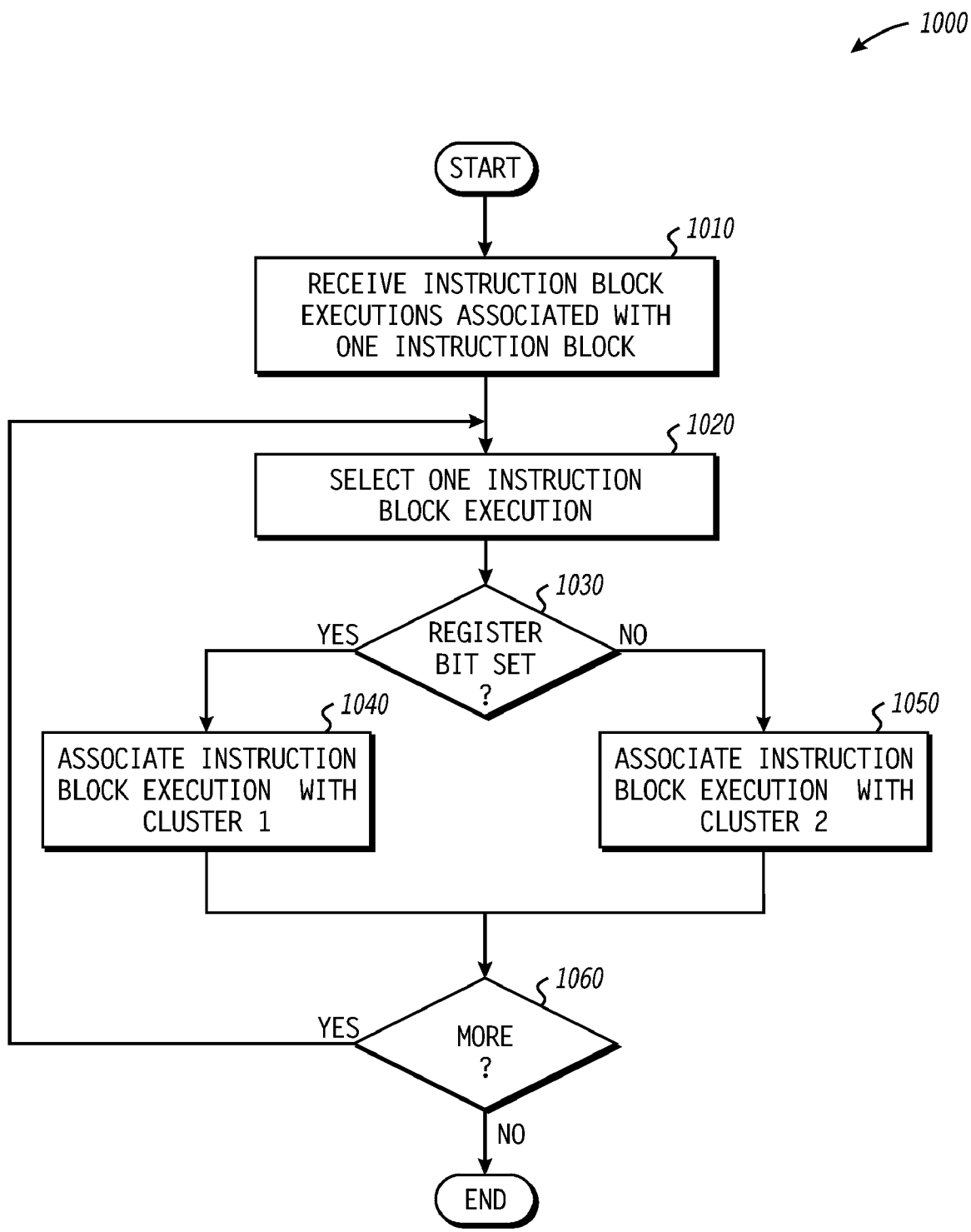
FIG. 10 is a flow diagram illustrating an association method in accordance with a specific embodiment of the present disclosure.

FIG. 10 is a flow diagram illustrating an association method 1000 in accordance with a specific embodiment of the present disclosure. Association method 1000 begins at block 1010 wherein a set of instruction block executions corresponding to one instruction block is received. The flow proceeds to block 1020 where an instruction block execution is evaluated based on the value of a bit at a particular register at a device design at the time that the instruction block was executed. If the bit at the register is set, the flow proceeds from decision block 1030 to block 1040 where the instruction block execution that is presently being evaluated is associated with a particular cluster. If the bit at the register was not set, the flow proceeds from decision block 1030 to block 1050 where the instruction block execution that is presently being evaluated is associated with a different cluster. The flow proceeds to decision block 1060 where it is determined whether another instruction block execution remains to be classified into a cluster. If another instruction block execution has yet to be classified, the flow returns to block 1020 where another instruction block execution is selected for classification. If all instruction block executions corresponding to the instruction block have been associated with a respective cluster, the flow is complete.

Returning to FIG. 9, if all instruction block executions are associated with a respective cluster, the flow proceeds to block 940 where energy characterization module 140 characterizes a representative member of each cluster to determine an energy dissipation corresponding to that member. The flow proceeds to block 950 where the energy dissipation associated with the representative member of each respective cluster is assigned to each member of the corresponding cluster by assignment module 150. The flow proceeds to block 960 where analysis module 160 determines a total amount of energy dissipation associated with the execution of workload program 102. Each instruction block execution included at each cluster contributes to the total amount of energy dissipation.

It will be understood that the specific methods herein, which can include functions performed at a specific module, will typically be executed at a data processor device such as a computer. Such methods may be in hardware, software, or combination thereof. For example, a specific method may be performed using software, which can include firmware, executed on one or more a processing modules.

Figure 11:
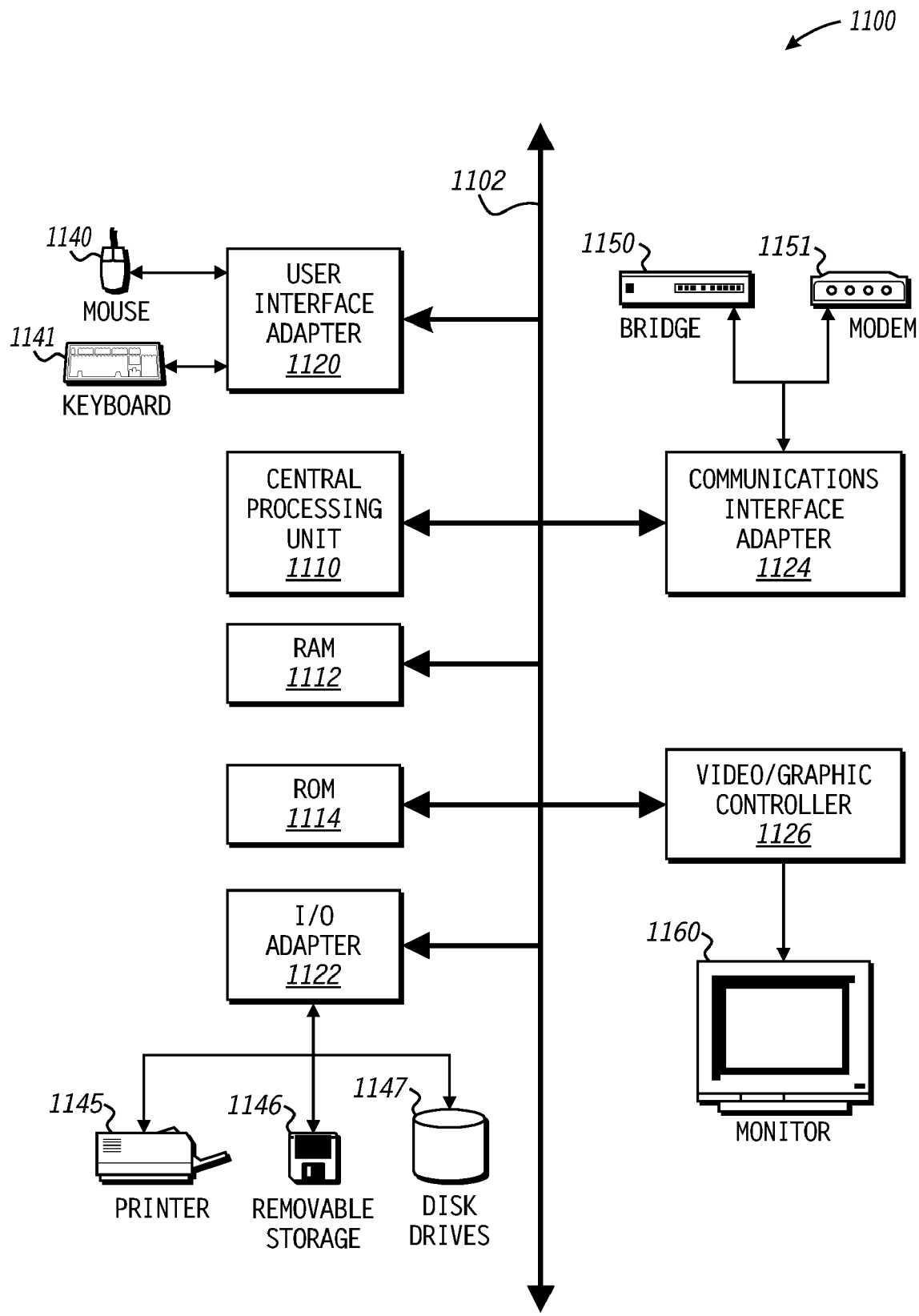
FIG. 11 is a block diagram illustrating a processing device in the form of a computer system in accordance with a specific embodiment of the present disclosure.

FIG. 11 illustrates, in block diagram form, a processing device in the form of a computer system 1100. Computer system 1100 is illustrated to include devices connected to each other a central processing unit 1110, which may be a conventional proprietary data processor, memory including a random access memory 1112, a read only memory 1114, and an input output adapter 1122, a user interface adapter 1120, a communications interface adapter 1124, and a multimedia controller 1126. Generally, system 1100 will be capable of implementing the system and methods described herein. For example, design file 1042 to be accessed and manipulated by the method described herein can be stored at disk drive 1147 or at memory 1112 and accessed by the CPU 1110 in response to an instruction.

Input output (I/O) adapter 1122 is further connected to, and controls, disk drives 1147, printer 1145, removable storage devices 1146, as well as other standard and proprietary I/O devices. User interface adapter 1120 can be considered to be a specialized I/O adapter. Adapter 1120 is connected to a mouse 1140, and a keyboard 1141. In addition, the user interface adapter 1120 may be connected to other devices capable of providing various types of user control, such as touch screen devices. Communications interface adapter 1124 is connected to a bridge 1150 such as is associated with a local or a wide area network, and a modem 1151. System bus 1102 can be connected to various communication devices to access external information. Multimedia controller 1126 will generally include a video graphics controller capable of displaying images upon the monitor 1160, as well as providing audio to external components (not illustrated).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, whereas a BB typically includes a single non-sequential instruction, which is the final instruction of that BB, a BB may include additional non-sequential instructions if the destination of the non-sequential instruction is to an instruction included at the same BB. In an embodiment, a non-sequential instruction may be associated with a delayed-branch instruction. A delayed-branch instruction is typically executed following the last instruction before the non-sequential instruction. Therefore, when a delayed-branch instruction follows a non-sequential instruction, the delayed-branch instruction can be included in the BB associated with the corresponding branch instruction, in which case the delayed branch instruction is the final instruction included at the BB. In the absence of a delayed-branch instruction, the instruction associated with a non-sequential instruction is the non-sequential instruction itself. In another embodiment, classification module 130 may determine that instruction block executions corresponding to different instruction blocks can be associated with a single cluster.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   partitioning a set of instructions executable at an integrated circuit into a plurality of instruction blocks, wherein each instruction of the set of instructions is a member of exactly one instruction block, each instruction block includes at least two instructions, and the last instruction included at each instruction block is a non-sequential instruction;
   simulating, at a computer, execution of the set of instructions at a first software representation of the integrated circuit, wherein during execution of the set of instructions a first instruction block is executed a plurality of times, including a corresponding first execution and second execution, and a second instruction block is executed a plurality of times including a corresponding first execution and second execution, the simulating further to determine a value representing a record of a state of design attributes of the integrated circuit during each execution;

associating the first execution of the first instruction block with a first set of executions based on the determined value;

associating the second execution of the first instruction block with a second set of executions based on the determined value;

determining, using a second software representation of the integrated circuit, a first amount of energy consumption that is representative of a member of the first set of executions;

determining, using the second software representation, a second amount of energy consumption that is representative of a member of the second set of executions;

assigning the first amount of energy consumption to each member of the first set of executions;

assigning the second amount of energy consumption to each member of the second set of executions; and determining a total amount of energy consumption associated with execution of the set of instructions, the total amount of energy consumption based on energy consumed by a plurality of sets of executions including the first set and the second set of executions, wherein each member of the first set of executions contributes the assigned first amount of energy consumption to the total amount of energy consumption, and each member of the second set of executions contributes the assigned second amount of energy consumption to the total amount of energy consumption.

2. The method of claim 1 further comprising:
associating the first execution of the second instruction block with a third set of executions based on the determined value.

3. The method of claim 1 further comprising:
associating the second execution of the second instruction block with a third set of executions based on the determined value.

4. The method of claim 2, further comprising associating all executions of the second instruction block with the third set of executions based on the determined value.

5. The method of claim 1,
wherein associating the first execution of the first instruction block with the first set of executions is based on the determined value stored at a register included at the first design representation of the integrated circuit.

6. The method of claim 5 further comprising:
associating the first execution of the first instruction block with the first set of executions in response to a first bit of the register having a first logic value, and associating the second execution of the first instruction block with the second set of executions in response to the first bit having a second logic value.

7. The method of claim 1, wherein
associating the first execution of the first instruction block with the first set of executions is based on the determined value stored at a cache memory.

8. The method of claim 1, wherein
associating the first execution of the first instruction block with the first set of executions is based on the determined value stored at a memory stack.

9. The method of claim 1, wherein
partitioning further comprises partitioning each instruction block of the plurality of instructions blocks include only one non-sequential instruction.

10. The method of claim 1, wherein
determining the first amount of energy consumption that is representative of the member of the first set of executions includes simulating the operation of the first execution of the first instruction block, wherein the energy consumption that is representative of the member of the first set of executions is based on the simulation of the first execution of the first instruction block.

11. The method of claim 10, wherein
an energy consumption that is representative of the member of the first set of executions is based only upon the simulation of the first execution of the first instruction block.

12. The method of claim 10, wherein
the first software representation includes a register-transfer-level representation of the integrated circuit and the second software representation includes a gate level or transistor level representation of the integrated circuit.

13. A device comprising:
a memory;
a partition module coupled to the memory to receive a set of instructions executable at an integrated circuit, and to partition the set of instruction into a plurality of instruction blocks, wherein each instruction of the set of instructions is a member of exactly one instruction block, each instruction block includes at least two instructions, and the last instruction included at each instruction block is a non-sequential instruction;
a simulation module coupled to the memory and to the partition module to simulate execution of the set of instructions at a first software representation of the integrated circuit, wherein during execution of the set of instructions a first instruction block is to be executed a plurality of times, including a corresponding first execution and second execution, and a second instruction block is to be executed a plurality of times, including a corresponding first execution and second execution, the simulating further to determine a value representing a record of a state of design attributes of the integrated circuit during each execution;
a classification module coupled to the memory and to the simulation module to associate the first execution of the first instruction block with a first set of executions, and to associate the second execution of the first instruction block with a second set of executions, the associating based on the determined value;
an energy characterization module coupled to the memory and to the classification module to determine a first amount of energy consumption that is representative of a member of the first set of executions, and to determine a second amount of energy consumption representative of a member of the second set of executions, the energy characterization module to simulate operation of a second software representation of the integrated circuit;
an assignment module coupled to the memory and to the energy characterization module to assign the first amount of energy consumption to each member of the first set of executions, and to assign the second amount of energy consumption to each member of the second set of executions; and
an analysis module coupled to the memory and to the assignment module to determine a total amount of energy consumption associated with execution of the set of instructions, the total amount of energy consumption based on energy consumed by a plurality of sets of executions including the first set and the second set of executions, wherein each member of the first set of executions contributes the assigned first amount of energy consumption to the total amount of energy consumption, and each member of the second set of executions contributes the assigned second amount of energy consumption to the total amount of energy consumption.

14. The device of claim 13 wherein the classification module is to further associate the first execution of the second instruction block with a third set of executions based on the determined value.

15. The device of claim 13, wherein:
the classification module is to further associate the first execution of the second instruction block with a third set of executions;
the energy characterization module is to further determine a third amount of energy consumption representative of a member of the third set of executions;
the assignment module is to further assign the third amount of energy consumption to each member of the third set of executions; and
the analysis module wherein each member of the third set of executions contributes the third amount of energy consumption to the total amount of energy consumption.

16. A non-transitory computer readable medium embodying a software program, the software program comprising executable instructions configured to manipulate at least one processor to:
partition a set of instructions executable at an integrated circuit into a plurality of instruction blocks, wherein each instruction of the set of instructions is a member of exactly one instruction block, each instruction block includes at least two instructions, and the last instruction included at each instruction block is a non-sequential instruction;
simulate execution of the set of instructions at a first software representation of the integrated circuit, wherein during execution of the set of instructions a first instruction block of the plurality of instruction blocks is executed a plurality of times, including a corresponding first execution and second execution, and a second instruction block of the plurality of instruction blocks is executed a plurality of times, including a corresponding first execution and second execution, the simulating further to determine a value representing a record of a state of design attributes of the integrated circuit during each execution;
associate the first execution of the first instruction block with a first set of executions based on the determined value;
associate the first execution of the second instruction block with a second set of executions based on the determined value;
determine, using a second software representation of the integrated circuit a first amount of energy consumption that is representative of a member of the first set of executions;
determine, using the second software representation of the integrated circuit, a second amount of energy consumption that is representative of a member of the second set of executions;
assign the first amount of energy consumption to each member of the first set of executions;
assign the second amount of energy consumption to each member of the second set of executions; and
determine a total amount of energy consumption associated with execution of the set of instructions, the total amount of energy consumption based on energy consumed by a plurality of sets of executions including the first set and the second set of executions, wherein each member of the first set of executions contributes the assigned first amount of energy consumption to the total amount of energy consumption, and each member of the second set of executions contributes the assigned second amount of energy consumption to the total amount of energy consumption.

17. The computer readable medium of claim 16, the software program is further configured to manipulate the at least one processor to:
associate the first execution of the first instruction block with the first set of executions based on the determined value stored at a register included at the first software representation of the integrated circuit.

18. The computer readable medium of claim 1,, wherein the software program is further configured to manipulate the at least one processor to:
associate the first execution of the first instruction block with the first set of executions in response to a first bit of the register having a first logic value, and associating the second execution of the first instruction block with the second set of executions in response to the first bit of the register having a second logic value.

\* \* \* \* \*

UNITED STATES PATENT AND TRADEMARK OFFICE
CERTIFICATE OF CORRECTION

PATENT NO. : 8,340,952 B2
APPLICATION NO. : 12/403156
DATED : December 25, 2012
INVENTOR(S) : Puneet Sharma et al.

Page 1 of 1

It is certified that error appears in the above-identified patent and that said Letters Patent is hereby corrected as shown below:

In the Claims:

In Column 14, Line 37, please change "claim 1,," to --claim 16,--.

Signed and Sealed this
Twenty-eighth Day of May, 2013

Teresa Stanek Rea
*Acting Director of the United States Patent and Trademark Office*